(12) United States Patent
Xie et al.

(10) Patent No.: US 12,343,968 B2
(45) Date of Patent: Jul. 1, 2025

(54) PROCESS FOR FORMING A LAMINATE

(71) Applicant: Dow Global Technologies LLC, Midland, MI (US)

(72) Inventors: Rui Xie, Pearland, TX (US); Jie Wu, Lake Jackson, TX (US)

(73) Assignee: Arkema France, Puteaux (FR)

( * ) Notice: Subject to any disclaimer, the term of this patent is extended or adjusted under 35 U.S.C. 154(b) by 328 days.

(21) Appl. No.: 17/296,156

(22) PCT Filed: Nov. 27, 2019

(86) PCT No.: PCT/US2019/063617
§ 371 (c)(1),
(2) Date: May 21, 2021

(87) PCT Pub. No.: WO2020/113008
PCT Pub. Date: Jun. 4, 2020

(65) Prior Publication Data
US 2023/0142982 A1 May 11, 2023

Related U.S. Application Data

(60) Provisional application No. 62/772,187, filed on Nov. 28, 2018.

(51) Int. Cl.
| | | |
|---|---|---|
| B32B 37/00 | (2006.01) | |
| B32B 7/12 | (2006.01) | |
| B32B 15/09 | (2006.01) | |
| B32B 27/08 | (2006.01) | |
| B32B 27/32 | (2006.01) | |
| B32B 27/36 | (2006.01) | |
| B32B 37/12 | (2006.01) | |
| C08G 18/10 | (2006.01) | |
| C08G 18/38 | (2006.01) | |
| C08G 18/48 | (2006.01) | |
| C08G 18/50 | (2006.01) | |
| C08G 18/66 | (2006.01) | |
| C08G 18/76 | (2006.01) | |
| C09J 5/04 | (2006.01) | |

(Continued)

(52) U.S. Cl.
CPC .......... *B32B 37/0038* (2013.01); *B32B 7/12* (2013.01); *B32B 15/09* (2013.01); *B32B 27/08* (2013.01); *B32B 27/32* (2013.01); *B32B 27/36* (2013.01); *B32B 37/12* (2013.01); *C08G 18/10* (2013.01); *C08G 18/3885* (2013.01); *C08G 18/482* (2013.01); *C08G 18/4854* (2013.01); *C08G 18/5027* (2013.01); *C08G 18/6666* (2013.01); *C08G 18/7671* (2013.01); *C09J 5/04* (2013.01); *C09J 175/08* (2013.01); *B32B 15/20* (2013.01); *B32B 2037/1253* (2013.01); *B32B 2255/06* (2013.01); *B32B 2255/10* (2013.01); *B32B 2255/26* (2013.01); *B32B 2307/748* (2013.01); *B32B 2309/02* (2013.01); *B32B 2309/04* (2013.01); *B32B 2309/12* (2013.01); *B32B 2311/24* (2013.01); *B32B 2323/04* (2013.01); *B32B 2367/00* (2013.01); *C09J 2400/166* (2013.01); *C09J 2467/008* (2013.01); *C09J 2475/00* (2013.01)

(58) Field of Classification Search
CPC ......... B32B 27/08; B32B 27/32; B32B 27/36; B32B 37/0038; B32B 37/12; B32B 7/12; B32B 15/09; B32B 15/20; B32B 15/085; B32B 2037/1253; B32B 2255/06; B32B 2255/10; B32B 2255/26; B32B 2307/748; B32B 2309/02; B32B 2309/04; B32B 2309/12; B32B 2311/24; B32B 2323/04; B32B 2367/00; C08G 18/10; C08G 18/3885; C08G 18/482; C08G 18/4854; C08G 18/5027; C08G 18/6666; C08G 18/7671; C08G 18/3814; C08G 18/4804; C08G 18/667; C09J 5/04; C09J 175/08; C09J 175/04; C09J 175/06; C09J 2400/166; C09J 2467/008; C09J 2475/00
USPC ........................................................ 156/310
See application file for complete search history.

(56) References Cited

U.S. PATENT DOCUMENTS

| | | | |
|---|---|---|---|
| 4,184,005 A | 1/1980 | Bauriedel et al. | |
| 4,342,613 A | 8/1982 | O'Leary et al. | |

(Continued)

FOREIGN PATENT DOCUMENTS

| | | | |
|---|---|---|---|
| EP | 0097206 A1 | 1/1984 | |
| GB | 2284381 A | 6/1995 | |

(Continued)

OTHER PUBLICATIONS

Machine translation of TW I508986 date unknown.*

Primary Examiner — John L Goff, II
(74) Attorney, Agent, or Firm — Boyle Fredrickson S.C.

(57) ABSTRACT

The present disclosure provides a process for forming a laminate. The process includes (A) uniformly applying an isocyanate component to a first substrate, the isocyanate component containing an isocyanate compound; (B) uniformly applying an isocyanate-reactive component to a second substrate, the isocyanate-reactive component containing an amine-terminated compound; (C) bringing the first substrate and the second substrate together, thereby mixing and reacting the isocyanate component and the isocyanate-reactive component to form an adhesive composition between the first substrate and the second substrate; (D) curing the adhesive composition to bond the first substrate and the second substrate; and (E) forming the laminate.

13 Claims, No Drawings

(51) Int. Cl.
*C09J 175/08*  (2006.01)
*B32B 15/20*  (2006.01)

(56) References Cited

U.S. PATENT DOCUMENTS

| | | |
|---|---|---|
| 2002/0157789 A1 * | 10/2002 | Imai .................. C08G 18/7642 |
| | | 156/331.7 |
| 2004/0105154 A1 | 6/2004 | Luong et al. |
| 2006/0078741 A1 | 4/2006 | Ramalingam, Jr. |
| 2008/0099141 A1 | 5/2008 | Booth et al. |
| 2013/0078473 A1 | 3/2013 | Kollbach et al. |
| 2018/0223143 A1 | 8/2018 | Bae et al. |

FOREIGN PATENT DOCUMENTS

| | | | |
|---|---|---|---|
| JP | 2003-171642 A | | 6/2003 |
| JP | 2015229296 A | | 12/2015 |
| TW | I508986 B | * | 11/2015 |
| TW | 201814014 A | | 4/2018 |
| TW | 201819582 A | | 6/2018 |
| WO | 2004/014977 A1 | | 2/2004 |
| WO | 2015/168670 A1 | | 11/2015 |
| WO | WO-2017023405 A1 | * | 2/2017 |
| WO | 2017/196528 A1 | | 11/2017 |
| WO | WO-2017196531 A1 | * | 11/2017 |
| WO | WO-2018140116 A1 | * | 8/2018 |

* cited by examiner

PROCESS FOR FORMING A LAMINATE

BACKGROUND

Laminates are traditionally formed with solvent-based adhesives that require an additional drying step to remove the solvent and form an adhesive layer. The drying step is traditionally accomplished by passing the substrates and solvent-based adhesive through an oven at an elevated temperature, which requires additional equipment and processing costs.

Attempts have been made to produce laminates with solvent-less adhesive containing an isocyanate component and an isocyanate-reactive component that are pre-mixed, and then applied to the substrates. However, pre-mixed solvent-less adhesives that provide sufficient adhesion between substrates exhibit a short pot life The art recognizes the need for improved processes for producing laminates with a solvent-less adhesive. The art also recognizes the need for improved processes for producing laminates with a solvent-less adhesive that exhibit longer pot life, faster bonding, and faster curing properties than those currently available to the market.

SUMMARY

The present disclosure provides a process for forming a laminate. The process includes (A) uniformly applying an isocyanate component to a first substrate, the isocyanate component containing an isocyanate compound; (B) uniformly applying an isocyanate-reactive component to a second substrate, the isocyanate-reactive component containing an amine-terminated compound; (C) bringing the first substrate and the second substrate together, thereby mixing and reacting the isocyanate component and the isocyanate-reactive component to form an adhesive composition between the first substrate and the second substrate; (D) curing the adhesive composition to bond the first substrate and the second substrate; and (E) forming the laminate.

The present disclosure also provides a laminate formed by the process.

The present disclosure provides a two-component solvent-less adhesive composition. The two-component solvent-less adhesive composition contains (A) an isocyanate component adapted for application to a first substrate, the isocyanate component containing an isocyanate prepolymer; (B) an isocyanate-reactive component adapted for application to a second substrate, the isocyanate-reactive component containing an amine-terminated compound; the two-component solvent-less adhesive composition having Isocyanate:Isocyanate-Reactive Stoichiometric Ratio from 1.0 to 5.0.

The present disclosure provides a laminate. The laminate includes a first substrate, a second substrate, and a solvent-less adhesive layer between the first substrate and the second substrate. The solvent-less adhesive layer contains (A) an isocyanate component comprising an isocyanate prepolymer and (B) an isocyanate-reactive component comprising an amine-terminated compound.

Definitions

Any reference to the Periodic Table of Elements is that as published by CRC Press, Inc., 1990-1991. Reference to a group of elements in this table is by the new notation for numbering groups.

For purposes of United States patent practice, the contents of any referenced patent, patent application or publication are incorporated by reference in their entirety (or its equivalent US version is so incorporated by reference) especially with respect to the disclosure of definitions (to the extent not inconsistent with any definitions specifically provided in this disclosure) and general knowledge in the art.

The numerical ranges disclosed herein include all values from, and including, the lower and upper value. For ranges containing explicit values (e.g., a range from 1, or 2, or 3 to 5, or 6, or 7), any subrange between any two explicit values is included (e.g., the range 1-7 above includes subranges 1 to 2; 2 to 6; 5 to 7; 3 to 7; 5 to 6; etc.).

Unless stated to the contrary, implicit from the context, or customary in the art, all parts and percents are based on weight and all test methods are current as of the filing date of this disclosure.

The term "composition" refers to a mixture of materials which comprise the composition, as well as reaction products and decomposition products formed from the materials of the composition.

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term "consisting essentially of" excludes from the scope of any succeeding recitation any other component, step, or procedure, excepting those that are not essential to operability. The term "consisting of" excludes any component, step, or procedure not specifically delineated or listed. The term "or," unless stated otherwise, refers to the listed members individually as well as in any combination. Use of the singular includes use of the plural and vice versa.

An "ethylene-based polymer," "ethylene polymer," or "polyethylene" is a polymer that contains equal to or greater than 50 wt %, or a majority amount of polymerized ethylene based on the weight of the polymer, and, optionally, may comprise one or more comonomers. The generic term "ethylene-based polymer" thus includes ethylene homopolymer and ethylene interpolymer. A suitable comonomer is an alpha-olefin. "Ethylene-based polymer" and the term "polyethylene" are used interchangeably. Nonlimiting examples of suitable ethylene-based polymer (polyethylene) include low density polyethylene (LDPE), linear low density polyethylene (LLDPE), and combinations thereof.

An "isocyanate" is a chemical that contains at least one isocyanate group in its structure. An isocyanate group is represented by the formula: —N=C=O. An isocyanate that contains more than one, or at least two, isocyanate groups is a "polyisocyanate." An isocyanate that has two isocyanate groups is a di-isocyanate and an isocyanate that has three isocyanate groups is a tri-isocyanate, etc. An isocyanate may be aromatic or aliphatic.

"Low density polyethylene" (or "LDPE") is an ethylene homopolymer, or an ethylene/α-olefin copolymer comprising at least one $C_3$-$C_{10}$ α-olefin, or a $C_3$-$C_4$ α-olefin, that has a density from 0.915 g/cc to 0.925 g/cc and contains long chain branching with broad MWD. LDPE is typically produced by way of high pressure free radical polymerization (tubular reactor or autoclave with free radical initiator).

A "polyether" is a compound containing two or more ether linkages in the same linear chain of atoms.

A "polyester" is a compound containing two or more ester linkages in the same linear chain of atoms.

A "polymer" is a polymeric compound prepared by polymerizing monomers, whether of the same or a different type. The generic term polymer thus embraces the term "homopolymer" (employed to refer to polymers prepared from only one type of monomer, with the understanding that trace amounts of impurities can be incorporated into the polymer structure), and the term "interpolymer," which includes copolymers (employed to refer to polymers prepared from two different types of monomers), terpolymers (employed to refer to polymers prepared from three different types of monomers), and polymers prepared from more than three different types of monomers. Trace amounts of impurities, for example, catalyst residues, may be incorporated into and/or within the polymer. It also embraces all forms of copolymer, e.g., random, block, etc. It is noted that although a polymer is often referred to as being "made of" one or more specified monomers, "based on" a specified monomer or monomer type, "containing" a specified monomer content, or the like, in this context the term "monomer" is understood to be referring to the polymerized remnant of the specified monomer and not to the unpolymerized species. In general, polymers herein are referred to has being based on "units" that are the polymerized form of a corresponding monomer.

A "polyol" is an organic compound containing multiple hydroxyl (—OH) groups. In other words, a polyol contains at least two hydroxyl groups. Nonlimiting examples suitable polyols include diols (which contain two hydroxyl groups) and triols (which contain three hydroxyl groups).

Test Methods

Amine group functionality is the number of amino groups (—NH$_2$ groups) present in a compound. Amine group functionality is measured in accordance with ASTM D2074.

Hydroxyl group functionality is the number of hydroxyl groups (—OH groups) present in a compound. Hydroxyl group functionality is measured in accordance with ASTM D4274-16.

Hydroxyl number (OH number) is the measure of the amount of reactive hydroxyl groups available for reaction. OH number is measured in accordance with ASTM D4274-D.

Isocyanate group (NCO) content by weight is measured in accordance with ASTM D2572-97.

Weight average molecular weight (Mw) is measured using a high temperature gel permeation chromatography (GPC) system.

Viscosity of the isocyanate prepolymer is measured at 25° C. in accordance with ASTM D2196, and is reported in centipoise (cP).

Bond Strength (90° T-Peel Test)

Bond strength is measured in accordance with the 90° T-Peel Test. The laminate is cut into 15 mm wide strips after curing at 23° C. and a relative humidity of 50% for 90 minutes, 24 hours (1 day), or 7 days for the T-peel bond strength test. A Thwing Albert™ QC-3A peel tester equipped with a 50 N loading cell is used to peel apart the first substrate and the second substrate at room temperature (23° C.), at speed of 4 inches/min. When the first substrate and the second substrate separate (peel), the average of the force during the pull is recorded. In the first substrate or the second substrate stretches or breaks, the maximum force or force at break is recorded. Three samples are tested and the average "bond strength" reported. The average bond strength is reported in Newtons per 15 millimeter (N/15 mm).

The failure mode (FM) is visually determined for each sample during the bond strength test. A failure mode of film stretch (FS); film tear/break (FT) indicates that the bond strength of the adhesive layer is sufficiently high for laminate applications. A failure mode of delaminated (DL), wherein the first substrate separates from the second substrate; adhesive transfer (AT), wherein the adhesive layer fails to adhere to the first substrate and is transferred to the second substrate; and adhesive split/cohesive failure (AS), wherein the adhesive layer breaks and appears on both the first substrate and the second substrate, indicates that the bond strength of the adhesive layer is insufficient for laminate applications.

Boil-in-Bag

Laminates of 23 cm×30.5 cm are folded onto themselves to provide a structure that is 23 cm×15.25 cm, the structure having a first side and a second side. Thus, the first side and the second side each is formed from the same laminate. The second substrate (LDPE film) of the first side is in contact with the second substrate (LDPE film) of the second side. The structure is cut with a paper cutter to a size of 12.7 cm×17.8 cm (maintaining the fold that separates the first side from the second side). The structure has four edges, including a fold edge and three open edges. Two of the open edges are heat sealed to form a pouch. Heat sealing occurs at 177° C. for 1 second at a hydraulic pressure of 276 kPa (40 Psi). Two to three pouches are made from each example.

Each pouch is filled through the remaining open edge with 100±5 mL of a sauce (a blend of equal parts by weight ketchup, vinegar, and vegetable oil). Splashing the sauce onto a heat seal area is avoided to prevent heat seal failure. After filling, the open edge is heat sealed in a manner that minimizes air entrapment inside of the closed pouch. Each closed pouch has four closed edges and an interior void that is 10.2 cm×15.2 cm (which is filled with sauce).

The integrity of each heat seal is visually inspected to ensure there are no flaws in the sealing that would cause the pouch to leak during testing. Pouches wish suspected flaws are discarded and replaced.

A pot is filled ⅔ full with water, and brought to a rolling boil. The boiling pot is covered with a lid to minimize water and steam loss. The pot is observed during the test to ensure enough water is present to maintain boiling. The pouches are individually placed in the boiling water, and kept in the boiling water for 30 minutes. The pouches are then removed from the boiling water and visually inspected for tunneling, blistering, delamination, and/or leakage.

The pouches are cut open, emptied of sauce, and rinsed with soap and water. One or more strips (with a width of 2.54 cm) of laminate are cut from the pouches (excluding heat seal areas). Bond strength of the laminate is measured in accordance with the 90° T-Peel Test as described above (but with a speed of 10 inches/min). Bond strength is measured as soon as possible after the pouches are emptied of sauce. The interior of the pouches are visually inspected for defects.

Isocyanate:Isocyanate-Reactive Stoichiometric Ratio

The Isocyanate:Isocyanate-Reactive Stoichiometric Ratio (I:IR Ratio) is the molar ratio of isocyanate groups in the isocyanate component to the combined amount of amine groups and hydroxyl groups, in the isocyanate-reactive component. The Isocyanate:Isocyanate-Reactive Stoichiometric Ratio (I:IR Ratio) is calculated in accordance with the following Equation (1):

$$I{:}IR\ \text{Ratio} = \frac{\begin{array}{c}\{(\text{Mass Isocyanate 1}/EW\ \text{Isocyanate 1}) +\\ (\text{Mass Isocyanate 2}/EW\ \text{Isocyanate 2})\ \ldots\}\end{array}}{\begin{array}{c}\{(\text{Mass Polyol }A/EW\ \text{Polyol }A) + (\text{Mass Amine} -\\ \text{Terminated Compond }A/EW\ \text{Amine} -\\ \text{Terminated Compound }A)\ \ldots\}\end{array}}$$

wherein "EW" refers to equivalent weight.

DETAILED DESCRIPTION

The present disclosure provides a two-component solvent-less adhesion composition and a process for forming a laminate comprising same. The process includes (A) uniformly applying an isocyanate component to a first substrate, the isocyanate component including an isocyanate compound; (B) uniformly applying an isocyanate-reactive component to a second substrate, the isocyanate-reactive component including an amine-terminated compound; (C) bringing the first substrate and the second substrate together, thereby mixing and reacting the isocyanate component and the isocyanate-reactive component to form an adhesive composition between the first substrate and the second substrate; (D) curing the adhesive composition to bond the first substrate and the second substrate; and (E) forming the laminate.

A. Uniformly Applying an Isocyanate Component to a First Substrate

The process includes the step of uniformly applying an isocyanate component to a first substrate.

A "uniform application" is a layer of a component, such as the isocyanate component, that is continuous (not intermittent) across a surface of the substrate, and of the same, or substantially the same, thickness across the surface of the substrate. In other words, a component that is uniformly applied to a substrate directly contacts the substrate surface, and the component is coextensive with the substrate surface.

Uniform application excludes discrete and discontinuous applications.

i. Isocyanate Component

The process includes the step of uniformly applying an isocyanate component to a first substrate, the isocyanate component including an isocyanate compound.

Nonlimiting examples of suitable isocyanate compounds include isocyanate monomer, isocyanate prepolymer, and combinations thereof.

An "isocyanate prepolymer" is the reaction product of an isocyanate monomer and at least one isocyanate-reactive compound that contains at least one hydroxyl group, at least one amino group, at least one thio group, or a combination thereof. An isocyanate prepolymer is a liquid intermediate between monomers and a final polymer.

Isocyanate Monomer

In an embodiment, the isocyanate compound is an isocyanate monomer.

In an embodiment, the isocyanate compound is an isocyanate prepolymer, which is the reaction product of an isocyanate monomer and at least one isocyanate-reactive compound.

An "isocyanate monomer" is a molecule that contains at least two isocyanate groups. The isocyanate monomer may chemically bind to a polyol to form a prepolymer. Nonlimiting examples of suitable isocyanate monomers include aromatic isocyanates, aliphatic isocyanates, carbodiimide modified isocyanate monomers, and the combinations thereof.

An "aromatic isocyanate monomer" is an isocyanate monomer containing one or more aromatic rings. Nonlimiting examples of suitable aromatic isocyanate monomers include isomers of methylene diphenyl dipolyisocyanate (MDI) such as 4,4-MDI, 4,4'-MDI, 2,4-MDI, 2,4'-MDI, and 2,2'-MDI; modified MDI such as carbodiimide modified MDI or allophanate modified MDI; isomers of toluene-dipolyisocyanate (TDI) such as 2,4-TDI, 2,4'-TDI, and 2,6-TDI; isomers of naphthalene-dipolyisocyanate (NDI) such as 1,5-NDI; isomers of phenylene dipolyisocyanate (PDI), such as 1,3-PDI and 1,4-PDI; and combinations thereof.

An "aliphatic isocyanate monomer" is an isocyanate monomer that is void of, or contains no, aromatic rings. Aliphatic isocyanate monomers include cycloaliphatic isocyanate monomer, in which the chemical chain is ring-structured. In an embodiment, the aliphatic isocyanate monomer contains from 3, or 4, or 5, or 6 to 7, or 8, 10, 12, or 13, or 14, or 15, or 16 carbon atoms in the linear, branched, or cyclic alkylene residue. Nonlimiting examples of suitable aliphatic isocyanate monomers include cyclohexane diisocyanate; methylcyclohexane diisocyanate; ethylcyclohexane diisocyanate; propylcyclohexane diisocyanate; methyldiethylcyclohexane diisocyanate; propane diisocyanate; butane diisocyanate; pentane diisocyanate; hexane diisocyanate; heptane diisocyanate; octane diisocyanate; nonane diisocyanate; nonane triisocyanate, such as 4-isocyanatomethyl-1,8-octane diisocyanate (TIN); decane di- and tri-isocyanate; undecane di- and tri-isocyanate; dodecane di- and tri-isocyanate; isophorone diisocyanate (IPDI); hexamethylene diisocyanate (HDI); diisocyanatodicyclohexylmethane (H12MDI); 2-methylpentane diisocyanate (MPDI); 2,2,4-trimethylhexamethylene diisocyanate; 2,4,4-trimethylhexamethylene diisocyanate; norbornane diisocyanate (NBDI); xylylene diisocyanate (XDI); tetramethylxylylene diisocyanate; isomers, dimers, and/or trimers thereof; and combinations thereof.

Nonlimiting examples of additional suitable isocyanate monomer include 4-methyl-cyclohexane 1,3-diisocyanate; 2-butyl-2-ethylpentamethylene diisocyanate; 3(4)-isocyanatomethyl-1-methylcyclohexyl isocyanate; 2-isocyanatopropylcyclohexyl isocyanate; 2,4'-methylenebis (cyclohexyl) diisocyanate; 1,4-diisocyanato-4-methyl-pentane; and combinations thereof.

In an embodiment, the isocyanate monomer is selected from a di-isocyanate monomer, a tri-isocyanate monomer, and combinations thereof. In a further embodiment, the isocyanate monomer is a di-isocyanate monomer.

In an embodiment, the isocyanate monomer is a multi-functional isocyanate monomer with at least two isocyanate groups, or at least three isocyanate groups.

The isocyanate monomer may comprise two or more embodiments disclosed herein.

Isocyanate-Reactive Compound

The isocyanate prepolymer is the reaction product of an isocyanate monomer and at least one isocyanate-reactive compound that contains at least one hydroxyl group, at least one amino group, at least one thio group, or a combination thereof.

Nonlimiting examples of suitable isocyanate-reactive compounds include polyesters, polycaprolactones, polyethers, polyacrylates, polycarbonates, polyols, and combinations thereof.

In an embodiment, the isocyanate-reactive compounds is a polyol. Nonlimiting examples of suitable polyols include polyester polyols, polycaprolactone polyols, polyether polyols, polycarbonate polyols, natural oil-based polyols, copolymers thereof, and combinations thereof. In an embodiment, the isocyanate-reactive compound is selected from a polyester polyol, a polyether polyol, and combinations thereof.

In an embodiment, the polyol includes a polyester polyol. A "polyester polyol" is a compound that contains a polyester and a polyol. Nonlimiting examples of suitable polyester polyols include polycondensates of diols, polyols (e.g., triols, tetraols), dicarboxylic acids, polycarboxylic acids (e.g., tricarboxylic acids, tetracarboxylic acids), hydroxy-carboxylic acids, lactones, and combinations thereof. The polyester polyols can also be derived from, instead of the free polycarboxylic acids, the corresponding polycarboxylic anhydrides, or corresponding polycarboxylic esters of lower alcohols.

Nonlimiting examples of suitable diols include ethylene glycol; butylene glycol; diethylene glycol (DEG); triethylene glycol; polyalkylene glycols, such as polyethylene glycol; 1,2-propanediol; 1,3-propanediol; 1,3-butanediol; 1,4-butanediol; 1,6-hexanediol; and neopentyl glycol (NPG).

Nonlimiting examples of suitable dicarboxylic acids include aliphatic acids, aromatic acids, and combinations thereof. Nonlimiting examples of suitable aromatic acids include phthalic acid, isophthalic acid, terephthalic acid, and tetrahydrophthalic acid. Nonlimiting examples of suitable of suitable aliphatic acids include hexahydrophthalic acid, cyclohexane dicarboxylic acid, adipic acid, azelaic acid, sebacic acid, glutaric acid, tetrachlorophthalic acid, maleic acid, fumaric acid, itaconic acid, malonic acid, suberic acid, 2-methyl succinic acid, 3,3-diethyl glutaric acid, 2,2-dimethyl succinic acid, and trimellitic acid. As used herein, the term "acid" also includes any anhydrides of said acid. Saturated aliphatic and/or aromatic acids are also suitable, such as adipic acid or isophthalic acid.

The polyester polyol may comprise two or more embodiments disclosed herein.

In an embodiment, monocarboxylic acids, such as benzoic acid and hexane carboxylic acid, are excluded from the isocyanate component.

In an embodiment, the polyol includes a polyether polyol. A "polyether polyol" is a compound that contains a polyether and a polyol. Nonlimiting examples of suitable polyether polyols include polyaddition products of ethylene oxide, propylene oxide, tetrahydrofuran, butylene oxide, and the co-addition and grafted products thereof; the polyether polyols obtained by condensation of polyhydric alcohols, or mixtures thereof; and combination thereof.

Nonlimiting examples of suitable polyether polyols include polypropylene glycol (PPG), polyethylene glycol (PEG), polybutylene glycol, polytetramethylene ether glycol (PTMEG), and combinations thereof.

The polyether polyol may comprise two or more embodiments disclosed herein.

In an embodiment, the isocyanate-reactive component is a polyol having a hydroxyl number (OH Number) from 5 mg KOH/g, or 10 mg KOH/g, or 14 mg KOH/g or 50 mg KOH/g, or 56 mg KOH/g, or 100 mg KOH/g, or 110 mg KOH/g to 450 mg KOH/g, or 500 mg KOH/g, or 850 mg KOH/g, or 1000 mg KOH/g, or 1500 mg KOH/g, or 2000 mg KOH/g. In an embodiment, the polyol has an OH number from 5 mg KOH/g to 2,000 mg KOH/g, or from 14 mg KOH/g to 850 mg KOH/g, or from 56 mg KOH/g to 500 mg KOH/g, or from 110 mg KOH/g to 450 mg KOH/g.

In an embodiment, the isocyanate-reactive component is a polyol having a Mw from 25 g/mol, or 62 g/mol, or 75 g/mol, or 100 g/mol, or 250 g/mol, or 350 g/mol, or 500 g/mol, or 1000 g/mol to 3000 g/mol, or 5000 g/mol, or 6000 g/mol, or 10000 g/mol, or 12000 g/mol, or 15000 g/mol, or 20000 g/mol.

In an embodiment, the isocyanate-reactive component is a polyol having a hydroxyl group functionality from 1.0, or 1.5, or 2.0 to 3.0, or 5.0, or 8.0, or 10.0, or 12.0. In another embodiment, the isocyanate-reactive component is a polyol having a hydroxyl group functionality from 1.0 to 12.0, or from 1.0 to 10.0, or from 1.0 to 5.0, or from 1.0 to 3.0, or from 1.5 to 3.0.

In an embodiment, the isocyanate-reactive component is a polyol having one, some, or all of the following properties: (i) an OH Number from 5 mg KOH/g to 2,000 mg KOH/g, or from 14 mg KOH/g to 850 mg KOH/g, or from 56 mg KOH/g to 500 mg KOH/g, or from 110 mg KOH/g to 450 mg KOH/g; and/or (ii) a Mw from 25 g/mol, or 62 g/mol, or 75 g/mol, or 100 g/mol, or 350 g/mol, or 500 g/mol, or 1000 g/mol to 3000 g/mol, or 5000 g/mol, or 10000 g/mol, or 15000 g/mol, or 20000 g/mol; and/or (iii) a hydroxyl group functionality from 1.0, or 1.5, or 2.0 to 3.0, or 5.0, or 10.0, or 12.0.

The isocyanate-reactive component may comprise two or more embodiments disclosed herein.

In an embodiment, the isocyanate prepolymer is the reaction product of an isocyanate monomer, at least isocyanate-reactive component, and an optional catalyst. Nonlimiting examples of suitable catalysts include dibutyltin dilaurate, zinc acetate, 2, 2-dimorpholinodiethylether, and combinations thereof.

In an embodiment, the isocyanate component, or further the isocyanate prepolymer, has an isocyanate (NCO) content by weight from 3 wt %, or 8 wt %, or 9 wt %, or 10 wt %, or 11 wt %, or 12 wt %, or 13 wt % to 14 wt %, or 15 wt %, or 16 wt %, or 17 wt %, or 18 wt %, or 20 wt %, or 25 wt %. In a further embodiment, the isocyanate component, or further the isocyanate prepolymer, has an NCO content by weight from 3 wt % to 25 wt %, or from 8 wt % to 18 wt %, or from 12 wt % to 15 wt %, or from 13 wt % to 14 wt %.

In an embodiment, the isocyanate component, or further the isocyanate prepolymer, has a viscosity at 25° C. from 5000 cP, or 6000 cP, or 7000 cP, or 8,000 cP to 9000 cP, or 10,000 cP, or 15,000 cP, or 20,000 cP. In a further embodiment, the isocyanate component, or further the isocyanate prepolymer, has a viscosity at 25° C. from 5,000 cP to 20,000 cP, or from 5,000 cP to 15,000 cP, or from 5,000 cP to 12,000 cP, or from 8,000 cP to 10,000 cP.

In an embodiment, the isocyanate component, or further the isocyanate prepolymer, has one or both of the following properties: (i) an NCO content by weight from 3 wt %, or 8 wt %, or 9 wt %, or 10 wt %, or 11 wt %, or 12 wt %, or 13 wt % to 14 wt %, or 15 wt %, or 16 wt %, or 17 wt %, or 18 wt %, or 20 wt %, or 25 wt %; and/or (ii) a viscosity at 25° C. from 5000 cP, or 6000 cP, or 7000 cP, or 8,000 cP to 9000 cP, or 10,000 cP, or 15,000 cP, or 20,000 cP.

The isocyanate prepolymer may comprise two or more embodiments disclosed herein.

The isocyanate compound may comprise two or more embodiments disclosed herein.

In an embodiment, the isocyanate component is solventless. In other words, the isocyanate component is void of, or substantially void of, solvent.

In an embodiment, the isocyanate component is void of, or substantially void of, free isocyanate-reactive component. In other words, the isocyanate prepolymer is formed to completion, and all of the isocyanate-reactive component reacts with the isocyanate monomer, before the isocyanate component is applied to the first substrate. No excess isocyanate-reactive component is present in the isocyanate component.

The isocyanate component may comprise two or more embodiments disclosed herein.

ii. First Substrate

The process includes the step of uniformly applying an isocyanate component to a first substrate.

Nonlimiting examples of suitable first substrates include film such as paper, woven and nonwoven fabric, polymer film, metal foil, and metal-coated (metallized) polymer film. In an embodiment, the film has a surface on which an image is printed with ink, which may be in contact with the adhesive composition.

In an embodiment, the first substrate is a film. The film may be a monolayer film or a multilayer film. The multilayer film contains two layers, or more than two layers. For example, the multilayer film can have two, three, four, five, six, seven, eight, nine, ten, eleven, or more layers. In an embodiment, the multilayer film contains only two layers, or only three layers.

In an embodiment, the film is a monolayer film with one, and only one, layer.

In an embodiment, the film includes a layer containing a component selected from ethylene-based polymer, propylene-based polymer, polyamide (such as nylon), polyester, ethylene vinyl alcohol (EVOH) copolymer, polyethylene terephthalate (PET), ethylene vinyl acrylate (EVA) copolymer, ethylene methyl acrylate copolymer, ethylene ethyl acrylate copolymer, ethylene butyl acrylate copolymer, ethylene acrylic acid copolymer, ethylene methacrylic acid copolymer, an ionomer of ethylene acrylic acid, an ionomer of methacylic acid, maleic anhydride grafted ethylene-based polymer, a polystyrene, a metal foil, a cellulose, cellophane, nonwoven fabric, and combinations thereof. A nonlimiting example of a suitable metal foil is aluminum foil. Each layer of a multilayer film may be formed from the same component, or from different components.

In an embodiment, the film includes a layer containing a component selected from PET, ethylene-based polymer, aluminum foil, and combinations thereof. In another embodiment, the film includes a layer containing PET.

In an embodiment, the film is a monolayer film having a single layer that is a PET layer.

In an embodiment, the film is a multilayer film having from 3 to 5 layers, or 3 and only three layers. The multilayer film includes a PET layer and an aluminum foil layer.

In an embodiment, the film contains an optional additive, such as a slip agent. A nonlimiting example of a suitable film containing a slip agent is GF-19, available from Berry Plastics.

The first substrate, and further the film, is a continuous structure with two opposing surfaces.

In an embodiment, the first substrate has a thickness from 5 µm, or 10 µm, or 12 µm, or 15 µm, or 20 µm, or 21 µm to 23 µm, or 24 µm, or 25 µm, or 30 µm, or 35 µm, or 40 µm, or 45 µm, or 50 µm, or 100 µm, or 150 µm, or 200 µm, or 250 µm, or 300 µm, or 350 µm, or 400 µm, or 450 µm, or 500 µm.

In an embodiment, the first substrate is a monolayer film having a single layer that is a PET layer.

In an embodiment, the first substrate is a multilayer film having from 3 to 5 layers, or 3 and only three layers. The multilayer film includes a PET layer and an aluminum foil layer.

The film may comprise two or more embodiments disclosed herein.

The first substrate may comprise two or more embodiments disclosed herein.

The process includes uniformly applying the isocyanate component to a first substrate, the isocyanate component containing an isocyanate. The isocyanate component is applied to a surface of the first substrate. The isocyanate component and the first substrate are in direct contact with each other. The term "directly contacts," as used herein, is a layer configuration whereby a substrate is located immediately adjacent to a component, a component layer, or an adhesive layer and no intervening layers, or no intervening structures, are present between the substrate and the component, the component layer, the an adhesive layer. The isocyanate component directly contacts a surface of the first substrate.

In an embodiment, the isocyanate component is applied to the first substrate at a coat weight from 0.1 g/m$^2$, or 0.5 g/m$^2$, or 1.0 g/m$^2$ to 1.5 g/m$^2$, or 2.0 g/m$^2$, or 3.0 g/m$^2$, or 5.0 g/m$^2$, or 10 g/m$^2$, or 15 g/m$^2$, or 20 g/m$^2$. In another embodiment, the isocyanate component is applied to the first substrate at a coat weight from 0.1 g/m$^2$ to 20 g/m$^2$, or from 0.1 g/m$^2$ to 10 g/m$^2$, or from 0.1 g/m$^2$ to 5.0 g/m$^2$, or from 0.1 g/m$^2$ to 2.0 g/m$^2$, or from 0.5 g/m$^2$ to 1.5 g/m$^2$. The isocyanate component that is applied to the first substrate forms an isocyanate-component layer on the first substrate. The isocyanate-component layer and the first substrate are in direct contact with each other. In an embodiment, the isocyanate-component layer has a coat weight from 0.1 g/m$^2$ to 20 g/m$^2$, or from 0.1 g/m$^2$ to 10 g/m$^2$, or from 0.1 g/m$^2$ to 5.0 g/m$^2$, or from 0.1 g/m$^2$ to 2.0 g/m$^2$, or from 0.5 g/m$^2$ to 1.5 g/m$^2$.

In an embodiment, the isocyanate component is applied to the first substrate at a temperature from 20° C., or 23° C. to 25° C., or 30° C.

In an embodiment, the process includes one, some, or all of the following steps: (i) providing the isocyanate component comprising an isocyanate prepolymer having an NCO content by weight from 3 wt %, or 5 wt %, or 8 wt %, or 9 wt %, or 10 wt %, or 11 wt %, or 12 wt %, or 13 wt % to 14 wt %, or 15 wt %, or 16 wt %, or 17 wt %, or 18 wt %, or 20 wt %, or 25 wt %; and/or (ii) providing the isocyanate component comprising an isocyanate prepolymer having a viscosity at 25° C. from 5000 cP, or 6000 cP, or 7000 cP, or 8,000 cP to 9000 cP, or 10,000 cP, or 15,000 cP, or 20,000 cP; and/or (iii) providing the isocyanate component, wherein the isocyanate component is void of, or substantially void of, solvent; and/or (iv) providing the isocyanate component, wherein the isocyanate component is void of, or substantially void of, free isocyanate-reactive component; and/or (v) providing the first substrate that is a monolayer film containing, consisting essentially of, or consisting of, PET; and/or (vi) providing the first substrate that is a multilayer film containing, consisting essentially of, or consisting of, 3 layers including a PET layer and an aluminum foil layer; and/or (vii) providing the first substrate that has a thickness from 5 µm, or 9 µm, or 10 µm, or 12 µm, or 15 µm, or 20 µm, or 21 µm to 23 µm, or 24 µm, or 25 µm, or 30 µm, or 35 µm, or 40 µm, or 45 µm, or 50 µm, or 100 µm, or 150 µm, or 200 µm, or 250 µm, or 300 µm, or 350 µm, or 400 µm, or 450 µm, or 500 µm; and/or (viii) applying the isocyanate component at a temperature from 20° C., or 23° C. to 25° C., or 30° C.; and/or (ix) applying the isocyanate component at a viscosity at 25° C. from 5000 cP, or 6000 cP, or 7000 cP, or 8,000 cP to 9000 cP, or 10,000 cP, or 15,000 cP, or 20,000 cP; and/or (x) forming an isocyanate-component layer on the first substrate having a coat weight from 0.1 g/m$^2$ to 20 g/m$^2$, or from 0.1 g/m$^2$ to 10 g/m$^2$, or from 0.1 g/m$^2$ to 5.0 g/m$^2$, or from 0.1 g/m$^2$ to 2.0 g/m$^2$, or from 0.5 g/m$^2$ to 1.5 g/m$^2$.

In an embodiment, the isocyanate component includes an optional additive. Nonlimiting examples of suitable optional additives include tackifiers, plasticizers, rheology modifiers, adhesion promoters, antioxidants, fillers, colorants, surfactants, solvents, and combinations thereof.

Nonlimiting examples of suitable application methods include brushing, pouring, spraying, coating, rolling, spreading, and injecting.

The uniformly applying the isocyanate component to a first substrate step may comprise two or more embodiments disclosed herein.

B. Uniformly Applying an Isocyanate-Reactive Component to a Second Substrate

The process includes the step of uniformly applying an isocyanate-reactive component to a second substrate.

i. Isocyanate-Reactive Component

The process includes the step of uniformly applying an isocyanate component to a second substrate. An "isocyanate-reactive component" is a composition that includes an amine-terminated compound.

An "amine-terminated compound" is a polymer that contains a terminal (end) amino ($-NH_2$) group. The isocyanate-reactive component may be a branched polymer structure whereby the isocyanate-reactive component has two, three, four, five, six, or more terminal amino groups.

In an embodiment, the amine-terminated compound is a diamine-terminated compound, which contains 2, and only 2, terminal amino groups.

In an embodiment, the amine-terminated compound is a triamine-terminated compound, which contains 3, and only 3, terminal amino groups.

Nonlimiting examples of suitable amine-terminated compounds include those derived from hydrocarbon feedstock based polyols, such as polyester polyols, polyether polyoyls, polyhydrocarbon polyols, polycaprolactone polyols, polycarbonate polyols, copolymers thereof, and combinations thereof; and natural seed oils, such as soy oil, sun flower oil, castor oil, other natural fatty acids, and combinations thereof.

Nonlimiting examples of suitable amine-terminated compounds include polyamine polyhydrocarbons, such as polyamine polydienes and polyamine polyalkylenes; polyamine polyethers, such as polyoxyethylene diamines, polyoxypropylene diamines; polyoxytetramethylene diamines, such as those available under the trade names of JEFFAMINE and VERSALINK Oligomeric Diamine; polyamine polyesters; polyamine polyamides; polyamine polycarbonates; polyamine polyimines; polyamine polyacrylates; polyamine polysiloxanes; polyamine polyether caprolactones; polyamine polyether carbonates; polyamine polyether esters; polyamine fatty acid polyols; polyamine dimmer fatty acid polyols; and combinations thereof.

In an embodiment, the amine-terminated compound is a diamine-terminated compound having the following Structure (A):

Structure (A)

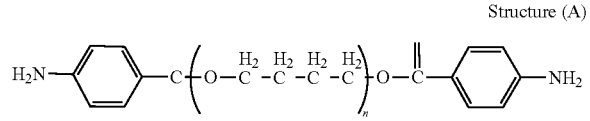

wherein n=1-30.

The diamine-terminated compound having the Structure (A) is a polytetramethyleneoxide-di-p-aminobenzoate. Nonlimiting examples of suitable diamine-terminated compound having the Structure (A) include VERSALINK™ P 650, VERSALINK™ P 1000, and VERSALINK™ P 250, each available from Air Products Company.

In an embodiment, the amine-terminated compound is a diamine-terminated compound having the following Structure (B):

Structure (B)

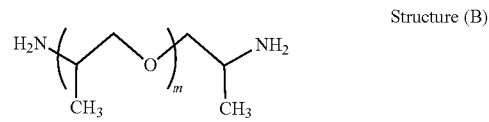

wherein m=1-100.

The diamine-terminated compound having the Structure (B) is a polyether diamine. A nonlimiting example of a suitable polyether diamine having the Structure (B) include the JEFFAMINE D Series Diamines, available from Huntsman Corporation.

In an embodiment, the amine-terminated compound is a diamine-terminated compound having the following Structure (C):

Structure (C)

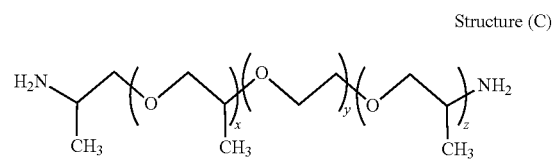

wherein x=1-20; y=1-50; and z=1-20.

The diamine-terminated compound having the Structure (C) is a polyether diamine. A nonlimiting example of a suitable polyether diamine having the Structure (C) include the JEFFAMINE ED Series Diamines, available from Huntsman Corporation.

In an embodiment, the amine-terminated compound is a diamine-terminated compound having the following Structure (D):

Structure (D)

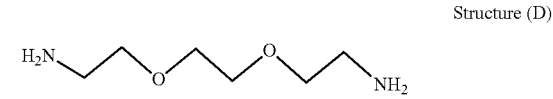

The diamine-terminated compound having the Structure (D) is a polyether diamine. A nonlimiting example of a suitable polyether diamine having the Structure (D) include the JEFFAMINE EDR Series Diamines, available from Huntsman Corporation.

In an embodiment, the amine-terminated compound is a triamine-terminated compound having the following Structure (E):

Structure (E)

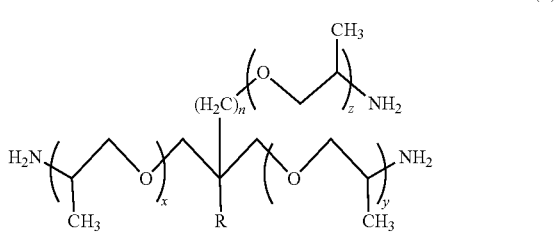

wherein n=1-5; x=1-100; y=1-100; and z=1-100.

The triamine-terminated compound having the Structure (E) is a polyether triamine. A nonlimiting example of a suitable polyether triamine having the Structure (E) include the JEFFAMINE SD-2001, JEFFAMINE D-205, and JEFFAMINE RFD-270, each available from Huntsman Corporation.

In an embodiment, the amine-terminated compound is selected from the diamine-terminated compound having the Structure (A), the diamine-terminated compound having the Structure (B), the diamine-terminated compound having the Structure (C), the diamine-terminated compound having the Structure (D), the triamine-terminated compound having the Structure (E), and combinations thereof.

In an embodiment, the amine-terminated compound has an amine group functionality from 2 to 3, or 4, or 5, or 6.

In an embodiment, the amine-terminated compound has a Mw from 200 g/mol, or 400 g/mol, or 500 g/mol, or 700 g/mol, or 710 g/mol to 950 g/mol, or 1000 g/mol, or 1500 g/mol, or 2000 g/mol, or 3000 g/mol, or 4000 g/mol, or 12000 g/mol.

In an embodiment, the amine-terminated compound has a viscosity at 25° C. from 1000 cP, or 1500 cP, or 2000 cP, or 2500 cP to 3000 cP, or 3500 cP, or 4000 cP, or 5000 cP, or 10000 cP, or 15000 cP, or 20000 cP, or 25000 cP, or 30000 cP. In another embodiment, the amine-terminated compound has a viscosity at 25° C. from 1000 cP to 30000 cP, or from 1,000 cP to 5,000 cP, or from 2,000 cP to 5,000 cP, or from 2,500 cP to 5,000 cP, or from 2,500 cP to 3,000 cP.

In an embodiment, the amine-terminated compound is the diamine-terminated compound having the Structure (A). The diamine-terminated compound has one or both of the following properties: (i) a Mw from 400 g/mol, or 500 g/mol, or 700 g/mol, or 710 g/mol to 950 g/mol, or 1000 g/mol, or 1500 g/mol, or 2000 g/mol, or 3000 g/mol, or 4000 g/mol, or 12000 g/mol; and/or (ii) a viscosity at 25° C. from 2000 cP, or 2500 cP to 3000 cP, or 3500 cP, or 4000 cP, or 5000 cP.

The amine-terminated compound may comprise two or more embodiments disclosed herein.

In an embodiment, the isocyanate-reactive component contains the amine-terminated compound and a polyol compound. The polyol compound contains a polyol.

The polyol of the polyol compound may be any polyol disclosed herein. In an embodiment, the isocyanate-reactive component contains a polyol compound including a polyether polyol, a polyester polyol, polyhydrocarbon polyols, polycaprolactone polyols, polycarbonate polyols, copolymers thereof, and combinations thereof; and natural seed oils, such as soy oil, sun flower oil, castor oil, other natural fatty acids, and combinations thereof.

In another embodiment, the isocyanate-reactive component contains a polyol compound that is a polyether polyol.

In an embodiment, the isocyanate-reactive component contains, consists essentially of, or consists of, the diamine-terminated polyether and a phosphate ester polyol. In another embodiment, the isocyanate-reactive component contains, consists essentially of, or consists of, the diamine-terminated polyether, a phosphate ester polyol, and a polyether polyol (such as PTMEG).

In an embodiment, the isocyanate-reactive component contains from 10 wt %, or 20 wt %, or 25 wt %, or 30 wt %, or 35 wt %, or 40 wt %, or 45 wt %, or 50 wt %, or 55 wt %, or 60 wt %, or 65 wt % to 90 wt %, or 95 wt %, or 99 wt %, or 100 wt % of the amine-terminated compound, based on the total weight of the isocyanate-reactive component. In another embodiment, the isocyanate-reactive component contains from 10 wt % to 100 wt %, or from 50 wt % to 100 wt %, or from 55 wt % to 100 wt %, or from 50 wt % to 99 wt %, or from 55 wt % to 99 wt %, or from 55 wt % to 95 wt %, or from 60 wt % to 90 wt % of the amine-terminated compound, based on the total weight of the isocyanate-reactive component.

In an embodiment, the isocyanate-reactive component contains from 10 wt %, or 20 wt %, or 25 wt %, or 30 wt %, or 35 wt %, or 40 wt %, or 45 wt %, or 50 wt %, or 55 wt %, or 60 wt %, or 65 wt % to 90 wt %, or 95 wt %, or 99 wt %, or 100 wt % of the amine-terminated compound; and a reciprocal amount of polyol compound, or from 0 wt %, or 1 wt %, or 5 wt %, or 10 wt % to 35 wt %, or 40 wt %, or 45 wt %, or 50 wt %, or 55 wt %, or 60 wt %, or 65 wt %, or 70 wt %, or 75 wt %, or 80 wt %, or 90 wt % polyol compound, based on the total weight of the isocyanate-reactive component.

In an embodiment, the isocyanate-reactive component has a viscosity at 25° C. from 1000 cP, or 1500 cP, or 2000 cP, or 2500 cP to 3000 cP, or 3500 cP, or 4000 cP, or 5000 cP. In another embodiment, the isocyanate-reactive component has a viscosity at 25° C. from 1,000 cP to 5,000 cP, or from 2,000 cP to 5,000 cP, or from 2,500 cP to 5,000 cP, or from 2,500 cP to 3,000 cP.

In an embodiment, the isocyanate-reactive component includes an optional additive. The optional additive may be any additive disclosed herein.

In an embodiment, the isocyanate-reactive component is solvent-less. In other words, the isocyanate-reactive component is void of, or substantially void of, solvent.

The isocyanate-reactive component is void of, or substantially void of, isocyanate component. In other words, the isocyanate-reactive component excludes chemicals containing an isocyanate group.

The isocyanate-reactive component may comprise two or more embodiments disclosed herein.

ii. Second Substrate

The process includes the step of uniformly applying the isocyanate-reactive component to a second substrate.

The second substrate may be any substrate disclosed herein.

The first substrate and the second substrate may be the same or different. In an embodiment, the first substrate and the second substrate are the same. A first substrate and the second substrate that are the same have identical structures and identical compositions.

A nonlimiting example of a suitable second substrate is a film. The film may be any film disclosed herein.

In an embodiment, the film includes a layer containing a component selected from PET, ethylene-based polymer, metal foil, and combinations thereof. In an embodiment, the film includes a layer containing LDPE.

In an embodiment, the film is a monolayer film having a single layer that is a LDPE layer.

In an embodiment, the film is a multilayer film having from 3 to 5 layers, or 3 and only three layers. The multilayer film includes a PET layer and an aluminum foil layer.

The second substrate, and further the film, is a continuous structure with two opposing surfaces.

In an embodiment, the second substrate is a monolayer film having a single layer that is a LDPE layer. The monolayer film has a thickness from 10 µm, or 12 µm, or 15 µm, or 20 µm, or 21 µm to 23 µm, or 24 µm, or 25 µm, or 30 µm, or 35 µm, or 40 µm, or 45 µm, or 50 µm.

The film may comprise two or more embodiments disclosed herein.

The second substrate may comprise two or more embodiments disclosed herein.

The process includes uniformly applying the isocyanate-reactive component to the second substrate, the isocyanate-reactive component containing an amine-terminated compound. The isocyanate-reactive component is applied to a surface of the second substrate. The isocyanate-reactive component and the second substrate are in direct contact with each other. The isocyanate-reactive component directly contacts a surface of the second substrate.

In an embodiment, the isocyanate-reactive component is applied to the second substrate at a coat weight from 0.1 g/m², or 0.5 g/m², or 1.0 g/m² to 1.5 g/m², or 2.0 g/m², or 3.0 g/m², or 5.0 g/m², or 10 g/m², or 15 g/m², or 20 g/m². In another embodiment, the isocyanate-reactive component is applied to the second substrate at a coat weight from 0.1 g/m² to 20 g/m², or from 0.1 g/m² to 10 g/m², or from 0.1 g/m² to 5.0 g/m², or from 0.1 g/m² to 2.0 g/m², or from 0.5 g/m² to 1.5 g/m². The isocyanate-reactive component that is applied to the second substrate forms an isocyanate-reactive component layer on the second substrate. The isocyanate-reactive component layer and the second substrate are in direct contact with each other. In an embodiment, the isocyanate-reactive component layer has a coat weight from 0.1 g/m² to 20 g/m², or from 0.1 g/m² to 2.0 g/m², or from 0.5 g/m² to 1.5 g/m².

In an embodiment, the isocyanate-reactive component is applied to the second substrate at a temperature from 20° C., or 23° C. to 25° C., or 30° C., or 40° C., or 50° C., or 60° C., or 70° C., or 80° C. In another embodiment, the isocyanate-reactive component is applied to the second substrate at a temperature from 20° C. to 80° C., or from 20° C. to 30° C., or from 20° C. to 25° C.

In an embodiment, the process includes one, some, or all of the following steps: (i) providing the isocyanate-reactive component containing an amine-terminated compound selected from the diamine-terminated compound having the Structure (A), the diamine-terminated compound having the Structure (B), the diamine-terminated compound having the Structure (C), the diamine-terminated compound having the Structure (D), the triamine-terminated compound having the Structure (E), and combinations thereof; and/or (ii) providing the isocyanate-reactive component containing an amine-terminated compound that is a diamine-terminated compound having the Structure (A); and/or (iii) providing the isocyanate-reactive component containing an amine-terminated compound that is a diamine-terminated polyether; and/or (iv) providing the isocyanate-reactive component containing an amine-terminated compound having a viscosity at 25° C. from 1000 cP, or 1500 cP, or 2000 cP, or 2500 cP to 3000 cP, or 3500 cP, or 4000 cP, or 5000 cP; and/or (v) providing the isocyanate-reactive component containing from 20 wt %, or 25 wt %, or 30 wt %, or 35 wt %, or 40 wt %, or 45 wt %, or 50 wt %, or 55 wt %, or 60 wt %, or 65 wt % to 90 wt %, or 95 wt %, or 99 wt %, or 100 wt % of the amine-terminated compound, based on the total weight of the isocyanate-reactive component; and/or (vi) providing the isocyanate-reactive component containing the amine-terminated compound and a polyol compound; and/or (vii) providing the isocyanate-reactive component containing the amine-terminated compound and a polyol compound selected from a polyether polyol, a polyester polyol, and combinations thereof; and/or (viii) providing the isocyanate-reactive component having has a viscosity at 25° C. from 1000 cP, or 1500 cP, or 2000 cP, or 2500 cP to 3000 cP, or 3500 cP, or 4000 cP, or 5000 cP; and/or (ix) providing the isocyanate-reactive component, wherein the isocyanate-reactive component is void of, or substantially void of, solvent; and/or (x) providing the isocyanate-reactive component, wherein the isocyanate-reactive component is void of, or substantially void of, isocyanate component; and/or (xi) providing the second substrate that is a monolayer film containing, consisting essentially of, or consisting of, PET; and/or (xii) providing the second substrate that is a multilayer film containing, consisting essentially of, or consisting of, 3 layers including a PET layer and an aluminum foil layer; and/or (xiii) providing the second substrate that has a thickness from 5 µm, or 9 µm, or 10 µm, or 12 µm, or 15 µm, or 20 µm, or 21 µm to 23 µm, or 24 µm, or 25 µm, or 30 µm, or 35 µm, or 40 µm, or 45 µm, or 50 µm, or 100 µm, or 150 µm, or 200 µm, or 250 µm, or 300 µm, or 400 µm, or 500 µm; and/or (xiv) applying the isocyanate-reactive component at a temperature from 20° C., or 23° C. to 25° C., or 30° C.; and/or (xv) applying the isocyanate-reactive component at a viscosity at 25° C. from 1000 cP, or 1500 cP, or 2000 cP, or 2500 cP to 3000 cP, or 3500 cP, or 4000 cP, or 5000 cP; and/or (xvi) forming an isocyanate-reactive component layer on the second substrate having a coat weight from 0.1 g/m² to 20 g/m², or from 0.1 g/m² to 10 g/m², or from 0.1 g/m² to 5.0 g/m², or from 0.1 g/m² to 2.0 g/m², or from 0.5 g/m² to 1.5 g/m².

Nonlimiting examples of suitable application methods include brushing, pouring, spraying, coating, rolling, spreading, and injecting.

In an embodiment, the process includes determining the Isocyanate:Isocyanate-Reactive Stoichiometric Ratio (I:IR Ratio) by calculating the molar ratio of isocyanate groups in the isocyanate component to the combined amount of amine groups and, if present, hydroxyl groups, in the isocyanate-reactive component; and adjusting the isocyanate coat weight and the amine-terminated coat weight to obtain an I:IR Ratio from 1.00, or 1.10, or 1.20, or 1.25 to 1.30, or 1.35, or 1.40, or 1.50, or 2.00, or 2.50, or 3.00, or 3.50, or 4.00, or 4.50, or 5.00.

In an embodiment, the isocyanate component and the isocyanate-reactive component each is a liquid at 25° C.

The uniformly applying the isocyanate-reactive component to a second substrate step may comprise two or more embodiments disclosed herein.

C. Bringing the First Substrate and the Second Substrate Together

The process includes the step of bringing the first substrate and the second substrate together, thereby mixing and reacting the isocyanate component and the isocyanate-reactive component to form an adhesive composition between the first substrate and the second substrate.

The first substrate and the second substrate are brought together such that the isocyanate component and the isocyanate-reactive component are in direct contact with each other. In other words, the isocyanate-component layer and the isocyanate-terminated component layer are in direct contact with each other.

In an embodiment, the first substrate and the second substrate are brought together at a temperature from 20° C., or 23° C. to 25° C., or 30° C., or 40° C., or 50° C., or 60° C., or 70° C., or 80° C. In another embodiment, the first substrate and the second substrate are brought together at a temperature from 20° C. to 80° C., or from 20° C. to 30° C., or from 20° C. to 25° C.

In an embodiment, the first substrate and the second substrate are brought together at a temperature from 20° C., or 23° C. to 25°, or 30° C. The isocyanate component and the isocyanate-reactive component directly contact each other. The first substrate and the second substrate are run through a device for applying pressure to the first substrate and the second substrate, such as a nip roller. A pressure from 5 psi to 100 psi is to the first substrate and the second substrate. The contact and pressure enable the mixing and reacting the isocyanate component and the isocyanate-reactive component to form the adhesive composition.

The first substrate and the second substrate may optionally be run through various other rollers, and ultimately to a rewind roller. Further mixing and reacting of the isocyanate component and the isocyanate-reactive component occurs as the first substrate and the second substrate pass through rollers because the substrates each take longer or shorter paths than the other substrate across each roller. In this way, the first substrate and the second substrate move relative to each other, mixing the components on the respective substrates.

The isocyanate component and the isocyanate-reactive component are formed separately and, if desired, stored separately until it is desired to form a laminate. The isocyanate component and the isocyanate-reactive component are not pre-mixed with each other before either is applied to the respective first substrate and second substrate. In other words, the isocyanate component and the isocyanate-reactive component do not contact each other until the first substrate is brought into contact with the second substrate. The isocyanate component and the isocyanate-reactive component are not pre-mixed because the two components react very quickly, causing the adhesive composition to gel and be unfit for application to a substrate. Because the isocyanate component and the isocyanate-reactive component are not pre-mixed when they are applied to the respective first substrate and second substrate, the present adhesive composition does not react until after application and the substrates are brought into contact with each other. When the first substrate is brought into contact with the second substrate, the isocyanate component and the isocyanate-reactive component mix and react to form an adhesive composition, which can be referred to as a "curable composition."

In an embodiment, the first substrate and the second substrate are brought together in a laminator. The laminator (A) applies the isocyanate component to a surface of a first substrate, (B) applies the isocyanate-reactive component to a surface of the second substrate, and (C) then brings the first substrate and the second substrate together, thereby mixing and reacting the isocyanate component and the isocyanate-reactive component to form an adhesive composition between the first substrate and the second substrate. A nonlimiting example of a suitable laminator is a 1-shot non-mechanical laminator.

The adhesive composition is in direct contact with the first substrate and the second substrate.

In an embodiment, the adhesive composition has an I:IR Ratio from 1.00, or 1.10, or 1.20, or 1.25 to 1.30, or 1.35, or 1.40, or 1.50, or 2.00, or 2.50, or 3.00, or 3.50, or 4.00, or 4.50, or 5.00. In another embodiment, the adhesive composition has an I:IR Ratio from 1.00 to 5.00, or from 1.00 to 3.00, or from 1.00 to 2.00, or from 1.10 to 1.50, or from 1.20 to 1.30.

The bringing the first substrate and the second substrate together step may comprise two or more embodiments disclosed herein.

D. Curing the adhesive Composition

The process includes the step of curing the adhesive composition to bond the first substrate and the second substrate.

The adhesive composition cures to form an adhesive layer between the first substrate and the second substrate.

In an embodiment, the adhesive composition is cured at a temperature from 15° C., or 20° C., or 23° C. to 25° C., or 30° C., or 40° C., or 50° C., or 60° C. for a period from 60 minutes (min), or 90 min to 24 hours, or 48 hours, or 7 days, or 10 days, or 14 days.

Curing the adhesive composition forms an adhesive layer between the first substrate and the second substrate. The adhesive layer directly contacts the first substrate and the second substrate.

In an embodiment, the adhesive layer has a thickness from 0.2 μm, or 0.5 μm, or 1 μm to 5 μm, or 10 μm, or 20 μm, or 30 μm, or 40 μm.

In an embodiment, the process includes one or both of the following steps: (i) curing the adhesive composition at a temperature from 20° C., or 23° C. to 25° C. for a period from 60 minutes (min), or 90 min to 24 hours, or 48 hours, or 7 days, or 10 days; and/or (ii) forming an adhesive layer having has a thickness from 0.2 μm, or 0.5 μm, or 1 μm to 5 μm, or 10 μm, or 20 μm, or 30 μm, or 40 μm.

In an embodiment, the laminate is dried at a temperature from 20° C. to 25° C. Curing the laminate excludes passing the first substrate, the second substrate, and the adhesive composition through an oven after the first substrate and the second substrate are brought together.

The curing the adhesive composition step may comprise two or more embodiments disclosed herein.

E. Forming the Laminate

The process includes the step of forming the laminate.

The laminate has the following Structure (F):

First Substrate/Adhesive Layer/Second Substrate Structure (F)

The adhesive layer of Structure (F) is formed from curing the adhesive composition. The adhesive composition is formed from mixing and reacting the isocyanate component and the isocyanate-reactive component.

The laminate includes the first substrate in direct contact with the adhesive layer, and the second substrate in direct contact with the adhesive layer.

The laminate includes alternating substrate layers and adhesive layers. The laminate includes at least 3 total layers, total layers including the substrate layers and the adhesive layers. In an embodiment, the laminate includes from 3 to 4, or 5, or 6, or 7, or 8, or 9, or 10 total layers.

In an embodiment, the laminate has a bond strength of greater than 0.05 N/15 mm after curing the adhesive composition at a temperature from 20° C. to 25° C. for 90 minutes. In another embodiment, the laminate has a bond strength of greater than 0.05 N/15 mm, or greater than 0.10 N/15 mm, or greater than 0.15 N/15 mm, or greater than 0.20 N/15 mm, or greater than 0.25 N/15 mm, or greater than 0.30 N/15 mm after curing the adhesive composition at a temperature from 20° C. to 25° C. for 90 minutes. In a further embodiment, the laminate has a bond strength from 0.05 N/15 mm, or 0.10 N/15 mm, or 0.15 N/15 mm, or 0.20 N/15 mm, or 0.25 N/15 mm, 0.30 N/15 mm to 3.5 N/15 mm, or 9.5 N/10 mm, or 10 N/15 mm, or 15 N/15 mm after curing the adhesive composition at a temperature from 20° C. to 25° C. for 90 minutes.

In an embodiment, during a bond strength test, the laminate exhibits film tear. In other words, the failure during the bond strength test is in a film layer of the first substrate and/or the second substrate, and not the adhesive layer.

In an embodiment, the laminate has a thickness from 10 µm, or 12 µm, or 15 µm, or 20 µm, or 21 µm to 23 µm, or 24 µm, or 25 µm, or 30 µm, or 35 µm, or 40 µm, or 45 µm, or 50 µm, or 100 µm, or 150 µm, or 200 µm, or 250 µm, or 300 µm, or 350 µm, or 400 µm, or 500 µm, or 750 µm, or 1000 µm.

The laminate has two opposing outermost surfaces. In an embodiment, at least one of the laminate's outermost surfaces is formed from an ethylene-based polymer layer (such as an LDPE layer). In another embodiment, at least one of the laminate's outermost surfaces is formed from a PET layer.

In an embodiment, the laminate contains, consists essentially of, or consists of: (i) the first substrate that is a film containing a metal foil layer (such as an aluminum foil layer); (ii) the adhesive layer formed from curing the adhesive composition, the adhesive layer in contact with a surface of the aluminum foil layer; (iii) the second substrate that is a film containing an ethylene-based polymer layer (such as LDPE), the adhesive layer in contact with a surface of the ethylene-based polymer layer; and the laminate has one, some, or all of the following properties: (a) a bond strength of greater than 0.05 N/15 mm, or from 0.06 N/15 mm, or 0.10 N/15 mm, or 0.15 N/15 mm, or 0.18 N/15 mm, or 0.40 N/15 mm, or 0.44 N/15 mm to 3.48 N/15 mm, or 3.50 N/15 mm, or 3.80 N/15 mm, or 4.00 N/15 mm, or 5.00 N/15 mm after curing the adhesive composition at a temperature from 20° C. to 25° C. for 90 minutes; and/or (b) a bond strength of greater than 4.0 N/15 mm, or greater than 5.0 N/15 mm, or from 5.0 N/15 mm, or 6.0 N/15 mm, or 7.0 N/15 mm, or 8.0 N/15 mm to 12.0 N/15 mm, or 15.0 N/15 mm, or 20.0 N/15 mm, or 25.0 N/15 mm after curing the adhesive composition at a temperature from 20° C. to 25° C. for 1 day; and/or (c) a bond strength of greater than 4.0 N/15 mm, or greater than 5.0 N/15 mm, or from 5.0 N/15 mm, or 6.0 N/15 mm, or 7.0 N/15 mm, or 8.0 N/15 mm to 13.0 N/15 mm, or 15.0 N/15 mm, or 20.0 N/15 mm, or 25.0 N/15 mm after curing the adhesive composition at a temperature from 20° C. to 25° C. for 7 days; and/or (d) a boil-in-bag bond strength from 430 g/inch, or 431 g/inch, or 1000 g/inch to 1250 g/inch, or 1300 g/inch, or 1400 g/inch, or 1500 g/inch, or 2000 g/inch; and/or (e) exhibits film tear during a bond strength test; and/or (f) a thickness from 10 µm, or 15 µm, or 20 µm to 25 µm, or 30 µm, or 40 µm, or 50 µm, or 100 µm, or 200 µm, or 300 µm, or 400 µm, or 500 µm, or 750 µm, or 1000 µm.

In an embodiment, the laminate contains, consists essentially of, or consists of: (i) the first substrate that is a film containing a PET layer; (ii) the adhesive layer formed from curing the adhesive composition, the adhesive layer in contact with a surface of the PET layer; (iii) the second substrate that is a film containing an ethylene-based polymer layer (such as LDPE), the adhesive layer in contact with a surface of the ethylene-based polymer layer; and the laminate has one, some, or all of the following properties: (a) a bond strength of greater than 0.05 N/15 mm, or from 0.06 N/15 mm, or 0.10 N/15 mm, or 0.15 N/15 mm, or 0.16 N/15 mm, or 0.30 N/15 mm, or 0.40 N/15 mm to 4.00 N/15 mm, or 5.00 N/15 mm, or 6.00 N/15 mm, or 7.00 N/15 mm, or 8.00 N/15 mm, or 9.00 N/15 mm, or 10.00 N/15 mm, or 12.00 N/15 mm, or 15.00 N/15 mm after curing the adhesive composition at a temperature from 20° C. to 25° C. for 90 minutes; and/or (b) a bond strength of greater than 10.15 N/15 mm, or greater than 10.20 N/15 mm, or from 10.15 N/15 mm, or 10.20 N/15 mm, or 10.50 N/15 mm, or 10.90 N/15 mm to 11.50 N/15 mm, or 12.00 N/15 mm, or 15.00 N/15 mm, or 20.0 N/15 mm after curing the adhesive composition at a temperature from 20° C. to 25° C. for 1 day; and/or (c) a bond strength of greater than 8.0 N/15 mm, or greater than 8.5 N/15 mm, or from 8.5 N/15 mm, or 9.0 N/15 mm, or 10.0 N/15 mm, or 11.0 N/15 mm, or 12.0 N/15 mm to 13.5 N/15 mm, or 14.0 N/15 mm, or 15.0 N/15 mm, or 20.0 N/15 mm after curing the adhesive composition at a temperature from 20° C. to 25° C. for 7 days; and/or (d) a boil-in-bag bond strength from 230 g/inch, or 250 g/inch, or 300 g/inch, or 350 g/inch, or 400 g/inch, or 420 g/inch, or 425 g/inch to 550 g/inch, or 600 g/inch, or 650 g/inch, or 700 g/inch, or 750 g/inch, or 800 g/inch, or 900 g/inch, or 1000 g/inch; and/or (e) exhibits film tear during a bond strength test; and/or (f) a thickness from 10 µm, or 15 µm, or 20 µm to 25 µm, or 30 µm, or 40 µm, or 50 µm, or 100 µm, or 200 µm, or 300 µm, or 400 µm, or 500 µm, or 750 µm, or 1000 µm.

In an embodiment, forming the laminate excludes passing the first substrate, the second substrate, and the adhesive composition through an oven after the first substrate and the second substrate are brought together.

The forming the laminate step may comprise two or more embodiments disclosed herein.

In an embodiment, the process includes, consists essentially of, or consists of: (i) uniformly applying an isocyanate component to a first substrate at a coat weight, the isocyanate component including an isocyanate compound; (ii) uniformly applying an isocyanate-reactive component to a second substrate at a coat weight, the isocyanate-reactive component including an amine-terminated compound; (iii) determining the I:IR Ratio by calculating the molar ratio of isocyanate groups in the isocyanate component to the combined amount of amine groups and hydroxyl groups in the isocyanate-reactive component; (iv) adjusting the isocyanate coat weight and the amine-terminated coat weight to obtain an I:IR Ratio from 1.0 to 5.0; (v) bringing the first substrate and the second substrate together, thereby mixing and reacting the isocyanate component and the isocyanate-reactive component to form an adhesive composition between the first substrate and the second substrate; (vi) curing the adhesive composition to bond the first substrate and the second substrate; and (vii) forming the laminate.

In an embodiment, the process includes applying the isocyanate component at a viscosity at 25° C. from 5,000 cP to 20,000 cP; forming an isocyanate-component layer on the first substrate having a coat weight from 0.1 g/m² to 20 g/m², or from 0.1 g/m² to 10 g/m², or from 0.1 g/m² to 5.0 g/m², or from 0.1 g/m² to 2.0 g/m², or from 0.5 g/m² to 1.5 g/m²; applying the isocyanate-reactive component at a viscosity at 25° C. from 1,000 cP to 5,000 cP; and forming an isocyanate-reactive component layer on the second substrate having a coat weight from 0.1 g/m² to 20 g/m², or from 0.1 g/m² to 10 g/m², or from 0.1 g/m² to 5.0 g/m², or from 0.1 g/m² to 2.0 g/m², or from 0.5 g/m² to 1.5 g/m².

In an embodiment, the process includes (A) uniformly applying the isocyanate component to the first substrate, the first substrate including a first film having a metal foil layer;

(B) uniformly applying the isocyanate-reactive component to the second substrate, the second substrate containing a second film including an ethylene-based polymer layer (such as an LDPE layer); (D) curing the adhesive composition at a temperature from 20° C. to 25° C. for a period of 90 minutes; and forming the laminate, the laminate having a bond strength of greater than 0.05 N/15 mm.

In an embodiment, the process includes (A) uniformly applying the isocyanate component to the first substrate, the first substrate containing a first film including a PET layer; (B) uniformly applying the isocyanate-reactive component to the second substrate, the second substrate containing a second film having an ethylene-based polymer layer (such as an LDPE layer); (D) curing the adhesive composition at a temperature from 20° C. to 25° C. for a period of 90 minutes; and (E) forming the laminate, the laminate having a bond strength of greater than 0.05 N/15 mm.

The process may comprise two or more embodiments disclosed herein.

The present disclosure also provides a laminate formed by the process disclosed herein.

The laminate may comprise two or more embodiments disclosed herein.

The present disclosure also provides an article containing the laminate. Nonlimiting examples of suitable articles include packages, bags, and pouches.

In an embodiment, the process includes contacting the laminate with a comestible. A "comestible" is an edible food item.

F. Adhesive Composition

The present disclosure provides a two-component solvent-less adhesive composition. The two-component solvent-less adhesive composition contains (A) an isocyanate component adapted for application to a first substrate, the isocyanate component containing an isocyanate prepolymer; (B) an isocyanate-reactive component adapted for application to a second substrate, the isocyanate-reactive component containing an amine-terminated compound; the two-component solvent-less adhesive composition having I:IR Ratio from 1.0 to 5.0.

The two-component solvent-less adhesive composition may be any adhesive composition formed by bringing the first substrate and the second substrate together, thereby mixing and reacting the isocyanate component and the isocyanate-reactive component between the first substrate and the second substrate disclosed herein.

G. Laminate

The present disclosure provides a laminate. The laminate includes a first substrate, a second substrate, and a solvent-less adhesive layer between the first substrate and the second substrate. The solvent-less adhesive layer contains (A) an isocyanate component comprising an isocyanate prepolymer and (B) an isocyanate-reactive component comprising an amine-terminated compound.

The solvent-less adhesive layer may be formed by any adhesive composition disclosed herein.

The laminate, first substrate, and second substrate may be any respective laminate, first substrate, and second substrate disclosed herein.

By way of example, and not limitation, some embodiments of the present disclosure will now be described in detail in the following Examples.

EXAMPLES

The materials used in the examples are provided in Table 1 below.

TABLE 1

| Material | Properties | Source |
|---|---|---|
| VERSALINK ™ P 650 | amine-terminated polyether (a polyether di-amine) polytetramethyleneoxide-di-p-aminobenzoate viscosity at 40° C. = 2,500 cPs; Mw = 710-950 g/mol | Air Products Company |
| VERSALINK ™ P 1000 | amine-terminated polyether (a polyether di-amine) polytetramethyleneoxide-di-p-aminobenzoate viscosity at 40° C. = 3,000 cP; Mw = 1,150-1,250 g/mol | Air Products Company |
| TERATHANE ™ 650 | polytetramethylene ether glycol (PTMEG) Mw = 650; viscosity at 40° C. = 150 cP | Invista |
| MOR-FREE ™ 88-138 | Hydroxyl terminated component; solvent-less polyol compound viscosity at 25° C. = 20,000 cP | The Dow Chemical Company |
| VORANOL ™ CP 1055 | polyether triol based on polypropylene oxide glycerine-initiated propoxylated polyether homopolymer triol Mw = 1000 g/mol; hydroxyl number = 152-160 mg KOH/g; | The Dow Chemical Company |
| isocyanate prepolymer | methylene diphenyl dipolyisocyanate (MDI) prepolymer NCO content = 13.5 wt %; viscosity at 25° C. = 13,000 cP | The Dow Chemical Company |
| 92LBT (PET Film) | polyethylene terephthalate film; thickness = 24 μm | DuPont |
| Prelam AL | Multilayer film having the following structure: PET film/ADCOTE ™ 550-COREACTANT F/Aluminum Foil Film PET film thickness = 12 μm lamination-grade AMCOR aluminum foil film thickness = 9 μm; ADCOTE ™ 550-COREACTANT F is a 2-component solvent-based adhesive containing a polyester component and an isocyanate component (available from The Dow Chemical Company) | The Dow Chemical Company |
| GF-10 (LDPE Film) | low density polyethylene film; thickness = 25 μm | Berry Plastics |

A. Preparation of the Isocyanate-Reactive Component

Isocyanate-Reactive Component Examples A-C and Polyol Comparative Sample D each is prepared by mixing the components of Table 2 in a mechanical mixer at a temperature of 60° C. for a period of 60 minutes under nitrogen protection. The amounts provided in Table 2 are in weight percent, based on the total weight of the respective component.

TABLE 2

Isocyanate-Reactive Component Examples and Polyol Comparative Sample

|  | Isocyanate-Reactive Component Example A | Isocyanate-Reactive Component Example B | Isocyanate-Reactive Component Example C | Polyol Comparative Sample D |
|---|---|---|---|---|
| VERSALINK ™ P 650 (di-amine-terminated polyether) | 65.0 wt % | — | 90.0 wt % | — |
| VERSALINK ™ P 1000 (di-amine-terminated polyether) | — | 60.0 wt % | — | — |
| TERATHANE ™ 650 (polytetramethlene ether glycol) | 25.0 wt % | 30.0 wt % | — | — |
| MOR-FREE ™ 88-138 (phosphate ester polyol) | 10.0 wt % | 10.0 wt % | 10.0 wt % | 10.0 wt % |
| VORANOL ™ CP 1055 (polyethyer triol) | — | — | — | 90.0 wt % |
| Total wt % | 100 | 100 | 100 | 100 |

B. Formation of a Laminate—Prelam AL/Adhesive/LDPE Film

An isocyanate component is provided that is an isocyanate prepolymer (an MDI prepolymer having an NCO content of 13.5 wt % and a viscosity at 25° C. of 13,000 cP). The isocyanate component is uniformly applied to the foil surface of the Prelam AL structure at a temperature of 23° C. The isocyanate coat weight of each sample is 1.0 g/m².

Isocyanate-Reactive Component Examples A-C and Polyol Comparative Sample D each is uniformly applied to a surface of a LDPE film (GF-10 film). The coat weight of each sample is 1.0 g/m².

The amount of isocyanate component, Isocyanate-Reactive Component Examples A-C, and Polyol Comparative Sample D applied to each substrate is provided in Table 4 (in parts by weight).

The Prelam AL and the LDPE film are brought together at a temperature of 50° C. and under a pressure of 40 psi, thereby mixing and reacting the (i) respective Isocyanate-Reactive Component Examples A-C or Polyol Comparative Sample D and the (ii) isocyanate component to form an adhesive composition between the Prelam AL and the LDPE film. The adhesive composition is cured at room temperature (23° C.) and 50% relative humidity for 90 minutes, 1 day, and 7 days, to form a laminate. After curing for 7 days, the laminate is subjected to the boil-in-bag test. Results are provided in Table 4.

C. Formation of a Laminate—PET Film/Adhesive/LDPE Film

An isocyanate component is provided that is an isocyanate prepolymer (an MDI prepolymer having an NCO content of 13.5 wt % and a viscosity at 25° C. of 1,300 cP). The isocyanate component is uniformly applied to a surface of the PET film (92LBT PET Film) at 23° C. The coat weight of each sample is 1.0 g/m².

Isocyanate-Reactive Component Examples A-C and Polyol Comparative Sample D each is uniformly applied to a surface of a LDPE film (GF-10 film). The coat weight of each sample is 1.0 g/m².

The amount of isocyanate component, Isocyanate-Reactive Component Examples A-C, and Polyol Comparative Sample D applied to each substrate is provided in Table 4 (in grams).

The PET film and the LDPE film are brought together at a temperature of 50° C. under a pressure of 40 psi, thereby mixing and reacting the (i) respective Isocyanate-Reactive Component Examples A-C or Polyol Comparative Sample D and the (ii) isocyanate component to form an adhesive composition between the PET film and the LDPE film.

TABLE 4

|  | Example 1 | Example 2 | Example 3 | Comparative Sample 4 |
|---|---|---|---|---|
| Isocyanate-Reactive Component Example A (parts) | 100.0 | — | — | — |
| Isocyanate-Reactive Component Example B (parts) | — | 100.0 | — | — |
| Isocyanate-Reactive Component Example C (parts) | — | — | 100.0 | — |
| Polyol Comparative Sample D (parts) | — | — | — | 100.0 |
| Isocyanate Component (parts) | 104.0 | 95.0 | 95.0 | 117.0 |
| Isocyanate:Isocyanate-Reactive Stoichiometric Ratio | 1.25 | 1.25 | 1.25 | 1.25 |
| Prelam AL/Adhesive/LDPE Film Laminate | | | | |
| Bond Strength after 90 min cure (N/15 mm) | 0.44 ± 0.02 (AS) | 0.18 ± 0.01 (AS) | 3.48 ± 0.09 (AT) | 0.03 ± 0.01 (AS) |
| Bond Strength after 1 day cure (N/15 mm) | 11.97 ± 1.6 (FT) | 8.64 ± 0.8 (FT) | 8.35 ± 0.4 (FT) | 3.87 ± 0.2 (AT) |

TABLE 4-continued

|  | Example 1 | Example 2 | Example 3 | Comparative Sample 4 |
|---|---|---|---|---|
| Bond Strength after 7 days cure (N/15 mm) | 12.45 ± 0.2 (FT) | 6.78 ± 0.5 (FT) | 5.48 ± 0.3 (FT) | 3.19 ± −0.1 (AT) |
| Boil-in-Bag (g/inch) | 1231 ± 186 (FS) | 1106 ± 175 (FT) | 431 ± 35 (AT) | 429 ± 54 (AS) |
| | | PET Film/Adhesive/LDPE Film Laminate | | |
| Bond Strength after 90 min cure (N/15 mm) | 0.30 ± 0.01 (AS) | 0.16 ± 0.01 (AS) | 9.10 ± 0.7 (FT) | 0.02 ± 0.01 (AS) |
| Bond Strength after 1 day cure (N/15 mm) | 10.99 ± 0.3 (FT) | 11.48 ± 0.2 (FT) | 10.99 ± 0.1 (FT) | 10.14 ± 0.1 (AS) |
| Bond Strength after 7 days cure (N/15 mm) | 8.59 ± 0.1 (FT) | 13.29 ± 0.5 (FT) | 10.70 ± 0.2 (FT) | 11.77 ± 0.3 (FT) |
| Boil-in-Bag (g/inch) | 425 ± 7 (FS) | 548 ± 34 (FS) | 237 ± 3 (AS) | 358 ± 21 (AT) |

AS = adhesive split or cohesive failure (adhesive is found on both substrates)
AT = adhesive transfer (adhesive is transferred from the first substrate to the second substrate)
FT = film tears or breaks
FS = film stretch The adhesive composition is cured at room temperature (23° C.) and 50% relative humidity for 90 minutes, 1 day, and 7 days, to form a laminate. After curing for 7 days, the laminate is subjected to the boil-in-bag test. Results are provided in Table 4.

D. Results

Comparative Sample 4 includes an adhesive layer formed from an isocyanate component and an isocyanate-reactive component (Polyol Comparative Sample D) that lacks an amine-terminated compound. In each of the Prelam AL/Adhesive/LDPE film Laminate and the PET film/Adhesive/LDPE film Laminate, Comparative Sample 4 exhibits a bond strength after 90 min of cure of less than 0.05 N/15 mm. Consequently, the Prelam AL/Adhesive/LDPE film Laminate and the PET film/Adhesive/LDPE film Laminate of Comparative Sample 4 each exhibits insufficient bond buildup within the first 90 minutes of cure.

Examples 1-3 each includes an adhesive layer formed from an isocyanate component and an isocyanate-reactive component (Isocyanate-Reactive Component Examples A-C) containing an amine-terminated compound and a polyol. Applicant found that in each of the Prelam AL/Adhesive/LDPE film Laminate and the PET film/Adhesive/LDPE film Laminate, Examples 1-3 exhibit a bond strength after 90 min of cure of greater than 0.05 N/15 mm. Consequently, the Prelam AL/Adhesive/LDPE film Laminate and the PET film/Adhesive/LDPE film Laminate of Examples 1-3 each exhibits sufficient bond buildup within the first 90 minutes of cure to enable fast reprocessing.

Examples 1-2 each includes an adhesive layer formed from an isocyanate component and an isocyanate-reactive component (Isocyanate-Reactive Component Examples A-B) containing an amine-terminated compound, a phosphate ester polyol, and a polyether polyol (PTMEG). Applicant found that in each of the Prelam AL/Adhesive/LDPE film Laminate and the PET film/Adhesive/LDPE film Laminate, Examples 1 unexpectedly exhibits a boil-in-bag bond strength greater than 1,000 g/inch and Example 2 exhibits a boil-in-bag bond strength greater than 400 g/inch. Consequently, Examples 1 and 2 each exhibits improved heat resistance.

It is specifically intended that the present disclosure not be limited to the embodiments and illustrations contained herein, but include modified forms of those embodiments including portions of the embodiments and combinations of elements of different embodiments as come within the scope of the following claims.

We claim:

1. A process for forming a laminate comprising:
(A) uniformly applying an isocyanate component at a viscosity at 25° C. from 5,000 cP to 20,000 cP to a first substrate, the isocyanate component comprising an isocyanate compound;
(B) uniformly applying an isocyanate-reactive component at a viscosity at 25° C. from 1,000 cP to 20,000 cP to a second substrate, the isocyanate-reactive component comprising
(i) from 60 wt % to 90 wt % of a diamine-terminated polyether having the structure (A)

Structure (A)

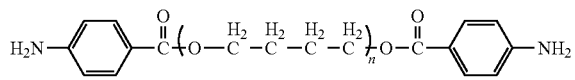

wherein n=1-30,
(ii) from 40 wt % to 10 wt % of a polyol component consisting of
(a) a phosphate ester polyol, and
(b) an optional polyether polyol, wherein weight percent is based on total weight of (B) and (B) (i) and (B) (ii) amount to 100 wt % of the isocyanate-reactive component (B);
(C) bringing the first substrate and the second substrate together, thereby mixing and reacting the isocyanate component and the isocyanate-reactive component to form an adhesive composition between the first substrate and the second substrate;
(D) curing the adhesive composition to bond the first substrate and the second substrate wherein the isocyanate component and the isocyanate-reactive component amount to 100 wt % of the adhesive composition; and
(E) forming the laminate.

2. The process of claim 1, comprising providing the isocyanate component comprising an isocyanate prepolymer having an isocyanate content by weight from 3 wt % to 25 wt %.

3. The process of claim 1, comprising
applying the isocyanate component to the first substrate at an isocyanate coat weight;
applying the isocyanate-reactive component to the second substrate at an isocyanate-reactive coat weight;

determining the Isocyanate: Isocyanate-Reactive Stoichiometric Ratio by calculating the molar ratio of isocyanate groups in the isocyanate component to the combined amount of amine groups and hydroxyl groups in the isocyanate-reactive component;
adjusting the isocyanate coat weight and the isocyanate-reactive coat weight to obtain an Isocyanate: Isocyanate-Reactive Stoichiometric Ratio from 1.0 to 5.0.

4. The process of claim 1, comprising
forming an isocyanate-component layer on the first substrate having a coat weight from 0.1 g/m$^2$ to 20 g/m$^2$; and
forming an isocyanate-reactive component layer on the second substrate having a weight from 0.1 g/m$^2$ to 20 g/m$^2$.

5. The process of claim 1, comprising curing the adhesive composition at a temperature from 20° C. to 25° C. for a period from 60 minutes to 10 days.

6. The process of claim 1, comprising
bringing the first substrate and the second substrate together at a temperature from 20° C. to 30° C.;
contacting the isocyanate component with the isocyanate-reactive component; and
applying a pressure from 5 psi to 100 psi to the first substrate and the second substrate.

7. The process of claim 1, comprising
(A) uniformly applying the isocyanate component to the first substrate, the first substrate comprising a first film comprising a metal foil layer;
(B) uniformly applying the isocyanate-reactive component to the second substrate, the second substrate comprising a second film comprising an ethylene-based polymer layer;
(D) curing the adhesive composition at a temperature from 15° C. to 50° C. for a period of 90 minutes; and
(E) forming the laminate, the laminate having a bond strength of greater than 0.05 N/15 mm.

8. The process of claim 1, comprising
(A) uniformly applying the isocyanate component to the first substrate, the first substrate comprising a first film comprising a polyethyleneterephthalate layer;
(B) uniformly applying the isocyanate-reactive component to the second substrate, the second substrate comprising a second film comprising an ethylene-based polymer layer;
(D) curing the adhesive composition at a temperature from 20° C. to 25° C. for a period of 90 minutes; and
(E) forming the laminate, the laminate having a bond strength of greater than 0.05 N/15 mm.

9. A laminate formed by the process of claim 1.

10. A two-component solvent-less adhesive composition comprising:
(A) an isocyanate component adapted for application to a first substrate, the isocyanate component comprising an isocyanate prepolymer;
(B) an isocyanate-reactive component adapted for application to a second substrate, the isocyanate-reactive component comprising
(i) from 60 wt % to 90 wt % of a diamine-terminated polyether having the structure (A)

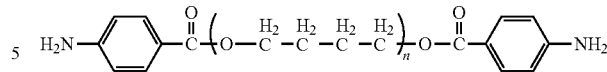

Structure (A)

wherein n=1-30,
(ii) from 40 wt % to 10 wt % of a polyol component consisting of
(a) a phosphate ester polyol, and
(b) an optional polyether polyol, wherein weight percent is based on total weight of (B) and (B) (i) and (B) (ii) amount to 100 wt % of the isocyanate-reactive component (B);
the two-component solvent-less adhesive composition having Isocyanate: Isocyanate-Reactive Stoichiometric Ratio from 1.0 to 5.0; and,
wherein the isocyanate component and the isocyanate-reactive component amount to 100 wt % of the adhesive composition.

11. The two-component solventless adhesive composition of claim 10 wherein the polyether polyol is selected from the group consisting of polypropylene glycol (PPG), polyethylene glycol (PEG), polybutylene glycol, polytetramethylene ether glycol (PTMEG), and combinations thereof.

12. A laminate comprising:
a first substrate;
a second substrate;
a solvent-less adhesive layer between the first substrate and the second substrate, the solvent-less adhesive layer comprising
(A) an isocyanate component comprising an isocyanate prepolymer; and
(B) an isocyanate-reactive component comprising
(i) from 60 wt % to 90 wt % of a diamine-terminated polyether having the structure (A)

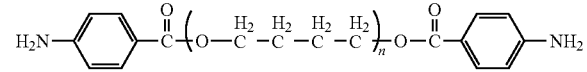

Structure (A)

wherein n=1-30,
(ii) from 40 wt % to 10 wt % of a polyol component consisting of
(a) a phosphate ester polyol, and
(b) an optional polyether polyol, wherein weight percent is based on total weight of (B) and (B) (i) and (B) (ii) amount to 100 wt % of the isocyanate-reactive component (B);
and wherein the isocyanate component and the isocyanate-reactive component amount to 100 wt % of the solvent-less adhesive layer.

13. The laminate of claim 12 wherein the polyether polyol is selected from the group consisting of polypropylene glycol (PPG), polyethylene glycol (PEG), polybutylene glycol, polytetramethylene ether glycol (PTMEG), and combinations thereof.

* * * * *